United States Patent
Sasaki (10) Patent No.: US 7,589,874 B2
(45) Date of Patent: Sep. 15, 2009

(54) COLOR PROCESSING METHOD AND APPARATUS THEREOF

(75) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 11/691,619

(22) Filed: Mar. 27, 2007

(65) Prior Publication Data

US 2007/0229864 A1    Oct. 4, 2007

(30) Foreign Application Priority Data

Mar. 31, 2006   (JP)  ............ 2006-100386

(51) Int. Cl.
*G03F 3/08* (2006.01)
*H04N 1/46* (2006.01)
*G09G 5/02* (2006.01)
*G06K 9/00* (2006.01)

(52) U.S. Cl. .............. 358/518; 358/1.9; 358/504; 358/520; 358/537; 345/589; 345/590; 345/591; 345/593; 382/162; 382/167

(58) Field of Classification Search .......... 358/518, 358/1.9, 520, 527, 537, 523, 504; 345/590, 345/591, 604, 593, 589; 382/162, 166, 167; 715/700
See application file for complete search history.

(56) References Cited

U.S. PATENT DOCUMENTS

| 5,416,890 | A  | * | 5/1995 | Beretta ............... 345/590 |
| 6,765,586 | B2 |   | 7/2004 | Yamazaki et al. |
| 7,176,935 | B2 | * | 2/2007 | Higgins ............... 345/589 |

* cited by examiner

*Primary Examiner*—Edward L Coles
*Assistant Examiner*—Charlotte M Baker
(74) *Attorney, Agent, or Firm*—Canon U.S.A. Inc., I.P. Division (57) ABSTRACT

When the color gamut of a printer is further expanded, if the same gamut expansion processing as in the prior art is applied, the chroma level becomes too high beyond necessity, resulting in extremely vivid colors. Hence, less than a favorable image is obtained. To solve this problem, information of each of an input gamut and output gamut is input, an expanding method of the input gamut is set, and an expanded gamut is generated by expanding the input gamut by that expanding method. Based on the information of the expanded gamut and output gamut, conversion characteristics required to convert the color values of the expanded gamut to those of the output gamut are calculated.

9 Claims, 8 Drawing Sheets

COLOR PROCESSING METHOD AND APPARATUS THEREOF

BACKGROUND OF THE INVENTION

1. Field of the Invention

The present invention relates to color processing including processing for expanding a color gamut.

2. Description of the Related Art

In general, upon comparison of an sRGB color space popularly used as a standard color space of a color monitor with a color gamut that can be reproduced by an ink-jet printer, the color gamut of the ink-jet printer is much broader than the sRGB color space in a cyan color range, a red color range using spot color inks, and the like. Hence, in order to realize more favorable color reproduction, the ink-jet printer reproduces memory colors such as blue of a sea, orange of a setting sun, and the like using the broader color gamut upon outputting an image compliant to the sRGB color space.

As a technique for fully using the dominant color gamut by the printer, a technique described in U.S. Pat. No. 6,765,586 is known. This technique includes hue shift processing for converting the shape of an input gamut to approach that of an output gamut, and gamut expanding processing for explaining the input gamut.

However, when the color gamut of the color printer is further expanded, if the same gamut expanding processing as the conventional processing is applied, the chroma level becomes too high beyond necessity, resulting in extremely vivid colors. Hence, less than a favorable image is obtained.

SUMMARY OF THE INVENTION

In one aspect of the present invention, an input method includes inputting information of an input gamut and an output gamut, setting an expanding method of the input gamut, generating an expanded gamut by expanding the input gamut by the expanding method, and calculating conversion characteristics required to convert color values of the expanded gamut into color values of the output gamut based on information of the expanded gamut and information of the output gamut.

A color gamut can be prevented from being expanded beyond necessity upon expanding the color gamut.

Further features of the present invention will become apparent from the following description of exemplary embodiments with reference to the attached drawings.

DESCRIPTION OF THE EMBODIMENTS

Image processing according to embodiments of the present invention will be described in detail hereinafter with reference to the accompanying drawings.

[Arrangement of Apparatus]

Figure 1:
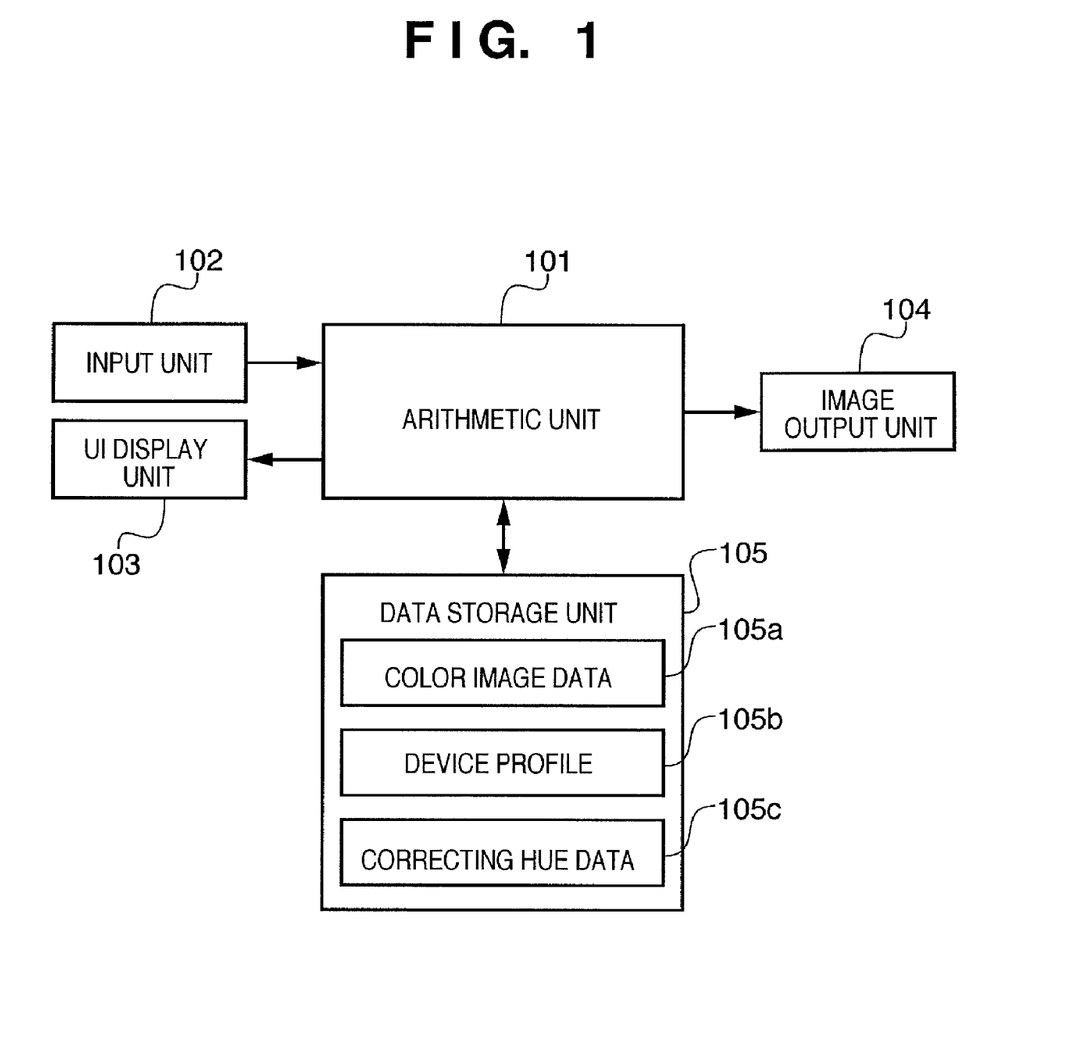
FIG. 1 is a block diagram showing an exemplary arrangement of a color processing apparatus.

FIG. 1 is a block diagram showing an exemplary arrangement of a color processing apparatus.

Referring to FIG. 1, an arithmetic unit 101 controls the apparatus and executes image processing. The arithmetic unit 101 has a central processing unit (CPU), a random access memory (RAM) used as a work memory, a read only memory (ROM) and hard disk drive (HDD) which store programs and data, and the like. An input unit 102 is a general-purpose interface such as USB (Universal Serial Bus), IEEE1394, and the like. The input unit 102 obtains inputs of user instructions via a keyboard, mouse, and the like, inputs of programs and data from storage media set in a disk drive and memory reader, and inputs of data from various devices. A user interface (UI) display unit 103 displays a user interface and color image on a color monitor or the like. An image output unit 104 is a general-purpose interface such as USB, IEEE1394, and the like, and outputs image data to a printer and the like. A data storage unit 105 is a memory such as a RAM, HDD, and the like, and holds color image data 105a, various device profiles 105b, correcting hue data 105c, and the like.

With this arrangement, the arithmetic unit 101 executes processing for applying color conversion of an input color image into favorable colors and outputting the converted image to the image output unit 104 based on programs which are stored in the HDD and are used to implement the processing shown in the flowcharts to be described hereinafter.

[Processing of Arithmetic Unit]

Figure 2:
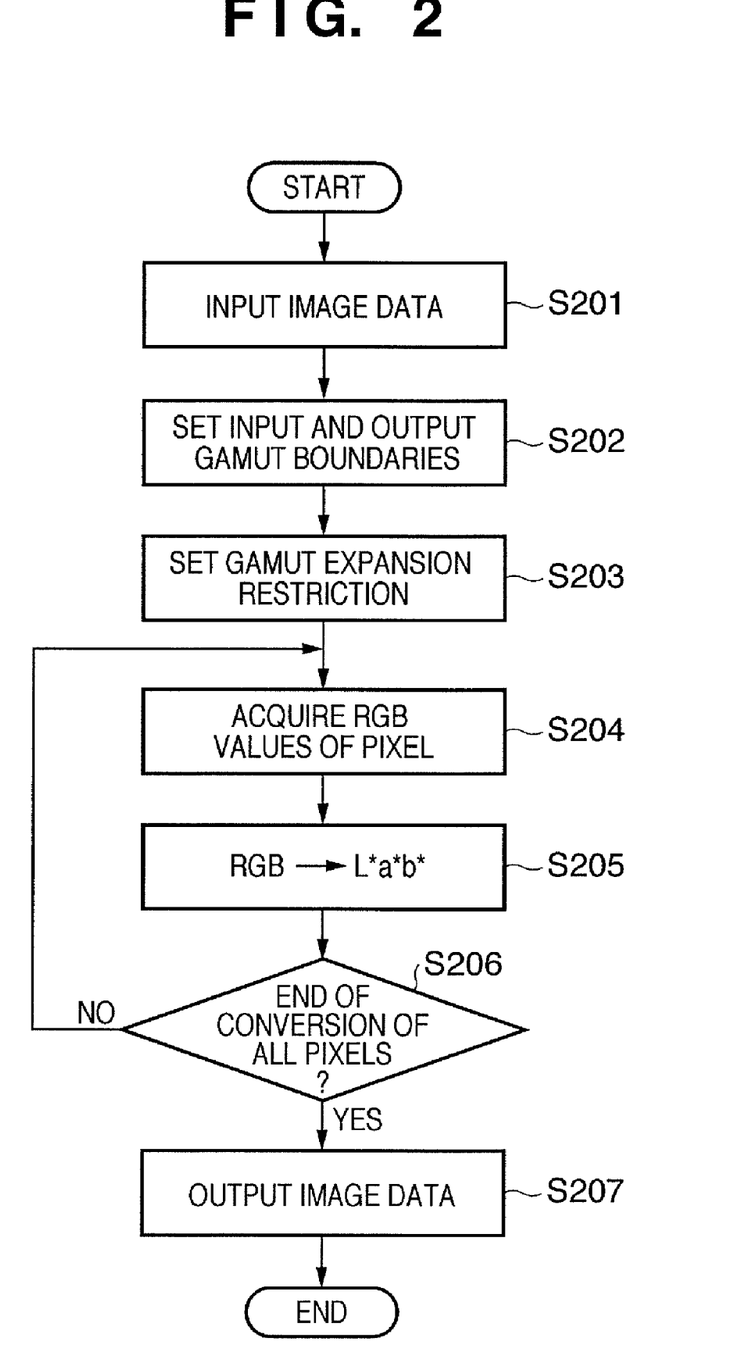
FIG. 2 is a flowchart showing details of processing to be executed by an arithmetic unit of the color processing apparatus.

FIG. 2 is a flowchart showing details of processing to be executed by the arithmetic unit 101.

The arithmetic unit 101 reads a color image and displays it on the UI display unit 103 (S201). As a color image input method, color image data stored in the data storage unit 105 is read in accordance with a user's instruction input to the input unit 102. Alternatively, color image data may be read from a device such as a digital camera or the like connected to the input unit 102, or from storage media set in the disk drive and memory reader.

The arithmetic unit 101 then sets gamut boundaries between an input device and output device (S202). In exemplary embodiments, the color gamut (input gamut) of the input device is sRGB, and the color gamut (output gamut) of the output device is that of an ink-jet printer. The gamut boundaries are set on a CIELAB color space. The user may select the input and output gamuts via the user interface. Other color spaces such as a CIELUV color space, CIECAM02 color space, and the like may be used as the color space. Also, the gamut boundaries may be set using a desired method. For example, sRGB can be converted into the CIELAB color space using a predetermined conversion formula to obtain the gamut boundaries. As for the ink-jet printer, a corresponding device profile held in advance in the data storage unit 105 may be loaded, or data obtained by measuring predetermined color patches may be input from the input unit 102 and may be analyzed, thus obtaining the gamut boundaries.

The arithmetic unit 101 displays a gamut expansion restriction setting window on the UI display unit 103 based on the set boundary information of the input and output gamuts. The arithmetic unit 101 then sets gamut expansion restriction parameters based on a user's instruction that pertains to the calculation method of the gamut expansion restriction parameters (S203). The method of setting gamut expansion restriction parameters will be described later.

The arithmetic unit 101 then converts the RGB values of the read color image data into L*a*b* values (S204), and applies conversion processing for converting the L*a*b* values into favorable colors (S205), as will be described in detail later. The arithmetic unit 101 checks if conversion of all pixels of the color image data is complete (S206). If pixels to be converted still remain (NO in S206), the process returns to step S204. On the other hand, if conversion of all pixels is complete (YES in S206), the arithmetic unit 101 outputs the converted image data to the image output unit 104. The image output unit 104 sends the image data to the printer (S207).

[Setting of Gamut Expansion Restriction]

Figure 3:
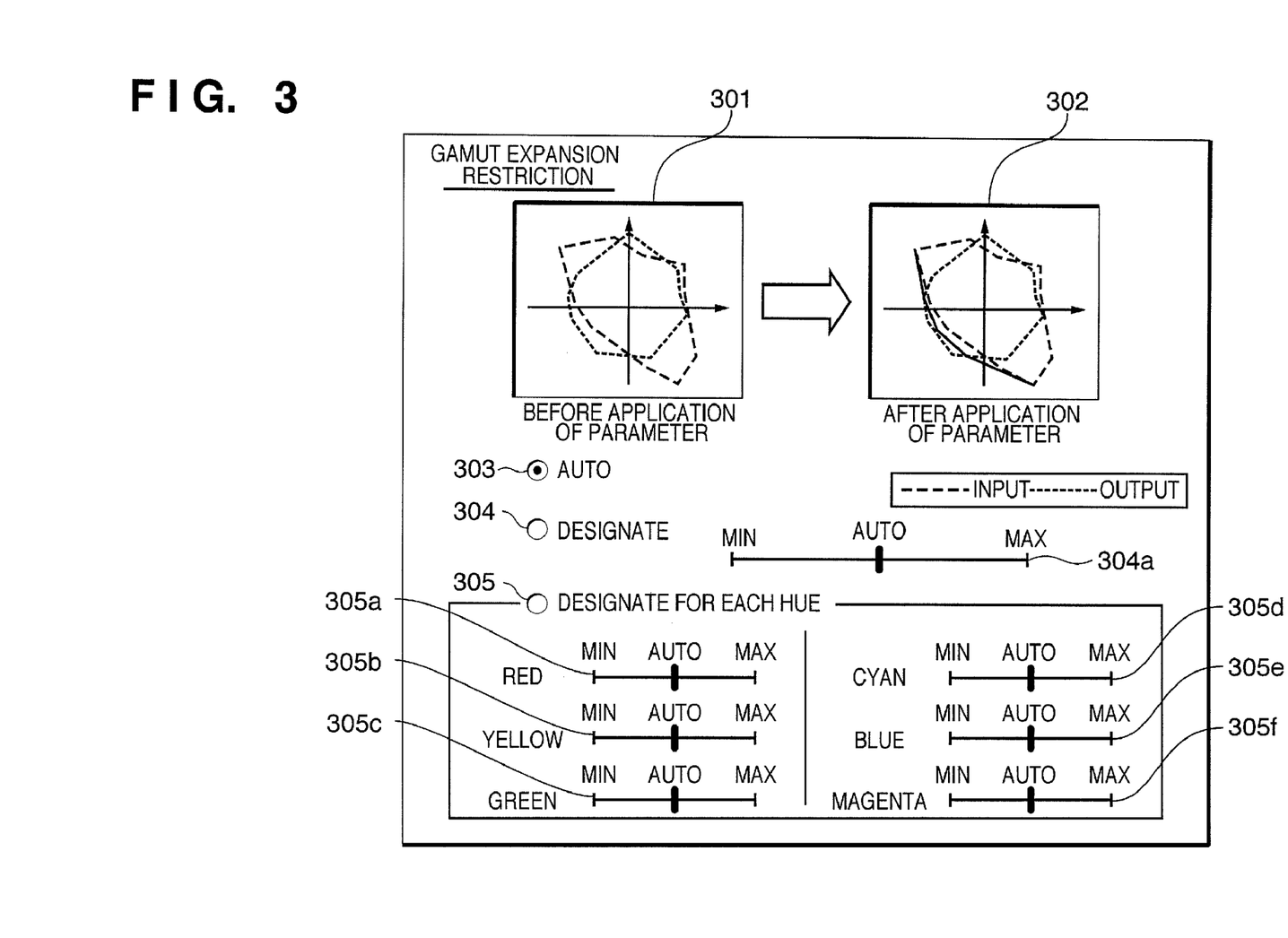
FIG. 3 shows an example of a gamut expansion restriction setting window.

FIG. 3 shows an example of the gamut expansion restriction setting window.

A display area 301 displays an input gamut boundary and output gamut boundary before application of gamut expansion. A display area 302 displays an input gamut boundary and output gamut boundary after application of gamut expansion. Therefore, the user can adjust gamut expansion restriction parameters with reference to the gamut boundaries displayed on the display areas 301 and 302. Note that the display areas 301 and 302 need only explicitly show changes in gamut before and after application of the gamut expansion restriction parameters. For example, charts obtained by plotting, on an a*b* plane, maximum chroma points of respective hue planes calculated based on the gamut boundaries set in step S202 may be displayed, as shown in FIG. 3, or LC planes of a hue plane to which gamut expansion restriction is to be applied may be displayed, as shown in FIG. 4A.

Radio buttons 303, 304, and 305 are used to designate a calculation method of the gamut expansion restriction parameters. Upon selection of the auto radio button 303, the arithmetic unit 101 calculates gamut expansion restriction parameters based on the chroma difference between the input gamut and output gamut. Then, the arithmetic unit 101 reflects an application result of gamut expansion based on the calculated gamut expansion restriction parameters in display of the display area 302.

Upon selection of the designate radio button 304, the user can operate a slide bar 304a used to control the gamut expansion restriction on the entire input gamut. When the user moves a slider of the slide bar 304a to the left, the input gamut displayed on the display area 302 is reduced; when the user moves the slider to the right, the input gamut displayed on the display area 302 is enlarged. That is, moving the slider to the left tightens the gamut expansion restriction, and moving the slider to the right relaxes the gamut expansion restriction.

Figure 4A:
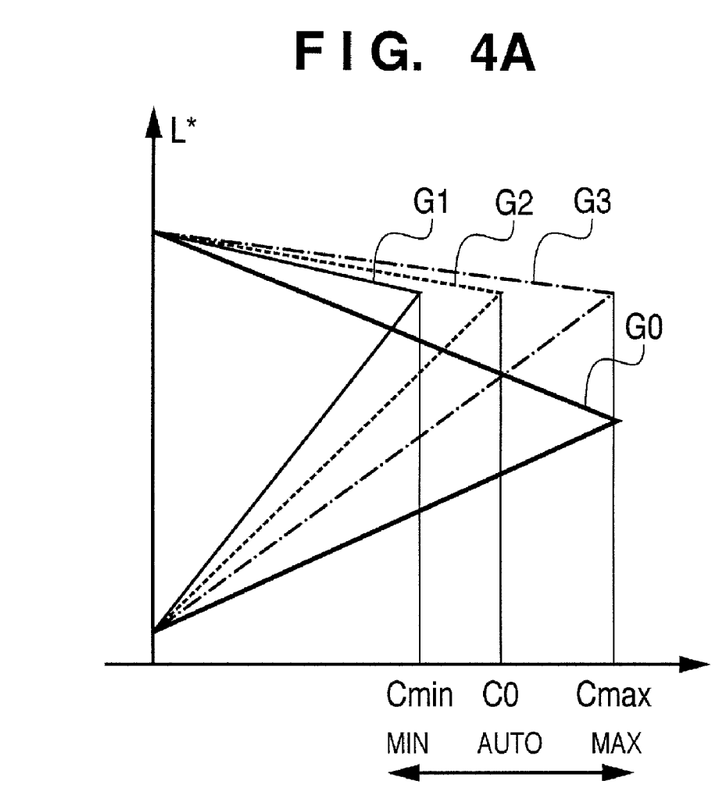
FIGS. 4A and 4B are graphs illustrating the relationship between gamut expansion restrictions and chroma conversion functions generated based on gamut expansion restriction parameters.
Figure 4B:
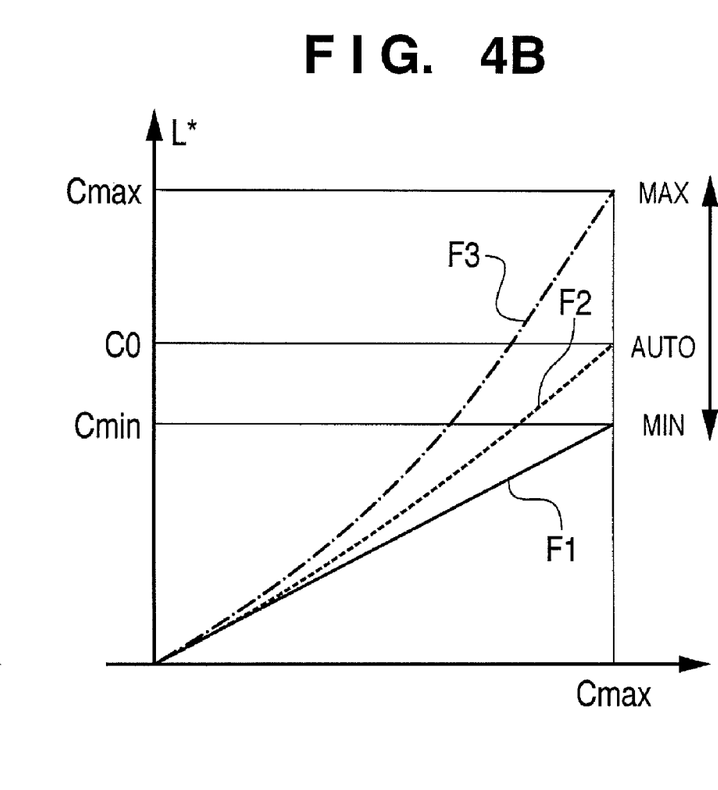

FIGS. 4A and 4B are graphs illustrating the relationship between instruction values by the slide bar 304a, and chroma conversion functions generated based on the gamut expansion restriction parameters $C_0$. Note that the gamut expansion restriction parameters $C_0$ are obtained by automatic calculations (to be described later).

The gamut expansion restriction parameters according to a manual instruction are obtained based on the instruction value by the slide bar 304a, the gamut expansion restriction parameters $C_0$ obtained by the automatic calculations, and an input gamut Csrc and output gamut Cdst.

Gamut expansion restriction parameters C according to the manual instruction when the output gamut Cdst is larger than the input gamut Csrc will be described below with reference to FIGS. 4A and 4B.

When the output gamut Cdst is smaller than the input gamut Csrc, gamut expansion cannot be executed. That is, the manual instruction is not allowed. As the gamut expansion restriction parameters C, the input gamut Csrc is set.

FIG. 4A shows a change in gamut expansion restriction on the LC plane, in which G0 indicates an output gamut boundary, G1 indicates an input gamut boundary, G2 indicates an input gamut boundary expanded by the automatic calculations, and G3 indicates the input gamut boundary expanded to a maximum chroma point of the output gamut. A minimum position (left end) of the slider corresponds to the input gamut boundary G1, and its maximum position (right end) corresponds to the input gamut boundary G3.

FIG. 4B shows changes in gamut expansion restriction as chroma conversion functions, in which F1 indicates a function which outputs the input gamut intact without expansion, F2 indicates a function expanded by the automatic calculations, and F3 indicates a function expanded to the maximum chroma point of the output gamut. That is, the minimum position of the slider corresponds to the chroma conversion function F1, and its maximum position corresponds to the chroma conversion function F3.

When the instruction value by the slide bar 304a is smaller than "auto", the gamut expansion restriction parameters C according to the manual instruction are obtained by weighting the gamut expansion restriction parameters $C_0$ and Cmin (Csrc) according to the instruction value by the slide bar 304a.

On the other hand, when the instruction value by the slide bar 304a is larger than "auto", the gamut expansion restriction parameters C according to the manual instruction are obtained by weighting the gamut expansion restriction parameters $C_0$ and Cmax (Cdst) according to the instruction value by the slide bar 304a.

Referring again to FIG. 3, upon selection of the designate for each hue radio button 305, the user can operate slide bars 305a to 305f used to control the gamut expansion restriction parameters C for respective hues of the input gamut. The user can control the hues of red, yellow, green, cyan, blue, and magenta using the slide bars 305a to 305f. Note that the correspondence between the moving directions of the sliders of the slide bars 305a to 305f and the gamut expansion restriction is the same as that of the slide bar 304a.

Note that adjustment of the gamut expansion restriction is not limited to use of the slide bars 304a and 305a to 305f. For example, radio buttons used to set gamut expansion restriction levels, an edit box which can set relative or absolute gamut expansion restriction parameters C with respect to the chroma difference between the input and output gamuts, or the like may be used.

The hues upon correction for respective hues are not limited to six hues, i.e., red, yellow, green, cyan, blue, and magenta, and the number of hues is not particularly limited. For example, the correctable hue may be limited to cyan hue, and an instruction value in increments of 1° of a hue angle may be read from the input unit 102 or data storage unit 105.

An instruction value of a hue corresponding to the gamut expansion restriction parameters C which are not adjustable is interpolated from that of a hue corresponding to the adjusted gamut expansion restriction parameters. For example, let hr be red hue, hy be yellow hue, pr be an instruction value of red hue, and py be an instruction value of yellow hue. Then, an instruction value px of a hue hx between red hue and yellow hue is calculated using linear interpolation by:

$$px=\{(hy-hx) \times py + (hx-hr) \times pr\}/(hy-hr) \quad (1)$$

The gamut expansion restriction parameters C at the hue hx are calculated from this instruction value px, the gamut expansion restriction parameters $C_0$ obtained by automatic calculations of the hue hx, and the input gamut Csrc and output gamut Cdst.

[Automatic Calculation of Gamut Expansion Restriction Parameter]

Figure 5:
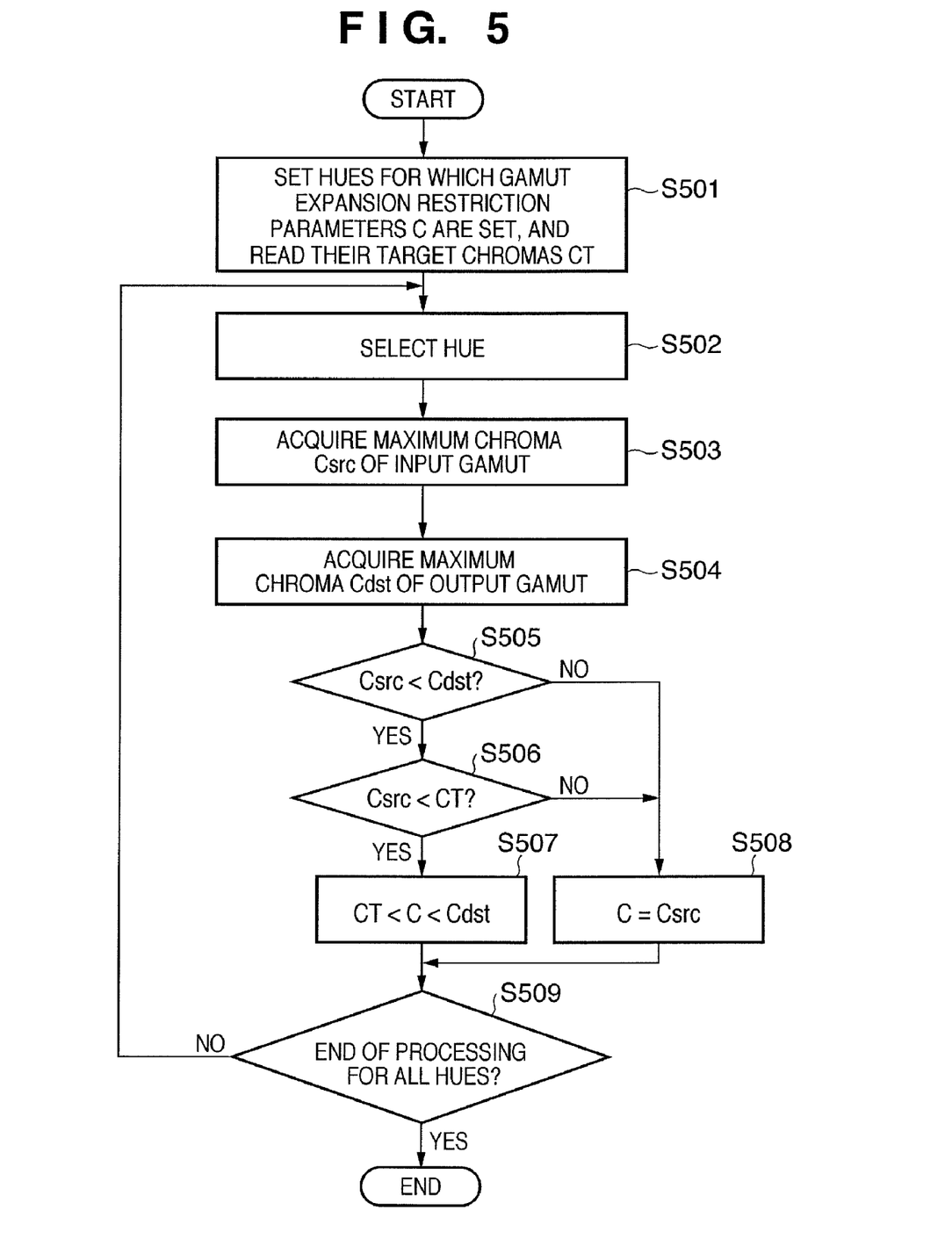
FIG. 5 is a flowchart illustrating an exemplary calculation method of gamut expansion restriction parameters by the arithmetic unit.

FIG. 5 is a flowchart illustrating an automatic calculation method of gamut expansion restriction parameters $C_0$ by the arithmetic unit 101.

The arithmetic unit 101 sets a plurality of hues for which gamut expansion restriction parameters C are set, and reads correcting hue data indicating the relationship between these hues and corresponding reproduction target chromas CT (S501). The arithmetic unit 101 may read the correcting hue data from the input unit 102 by a desired method or may read the data pre-stored in the data storage unit 105. Note that the number of hues for which the gamut expansion restriction parameters C are set is not limited and the gamut expansion restriction parameters C can be set for an arbitrary number of hues.

The reproduction target chroma CT is a predetermined chroma, which is smaller than the color gamut of a general printer. When the reproduction target chroma CT is larger than Cdst of the printer, CT is replaced by Cdst. The reproduction target chroma CT is a parameter used to suppress excessive emphasis of a chroma by expanding the color gamut to the output gamut Cdst. In this embodiment, the reproduction target chroma CT is determined in advance based on empirical values.

The arithmetic unit 101 selects one, for which the gamut expansion restriction parameter C is not set, of the plurality of hues (S502). The arithmetic unit 101 acquires a maximum chroma Csrc of the hue selected in step S502 from the input gamut boundary set in step S202 (S503), and acquires a maximum chroma Cdst of the hue selected in step S502 from the output gamut boundary set in step S202 (S504). The arithmetic unit 101 compares Csrc and Cdst (S505). If Csrc<Cdst (YES in S505), the process advances to step S506; if Csrc≧Cdst (NO in S505), the process advances to step S508.

If Csrc<Cdst (YES in S505), the arithmetic unit 101 acquires the reproduction target chroma CT corresponding to the hue selected in step S502, and compares it with Csrc (S506). If Csrc<CT (YES in S506), the process advances to step S507; if Csrc≧CT (NO in S506), the process advances to step S508.

If Csrc<Cdst (YES in S505) and Csrc<CT (YES in S506), the gamut expansion restriction parameter C for the hue selected in step S502 is set (S507) to meet:

$$CT < C < Cdst \quad (2)$$

For example, C=(CT+Cdst)/2 may be calculated.

If Csrc≧Cdst (NO in S505) or Csrc<Cdst (YES in S505) and Csrc≧CT (NO in S506), the gamut expansion restriction parameter C=Csrc is set without expanding the input gamut (S508).

The arithmetic unit 101 checks if the gamut expansion restriction parameters C are calculated for all the hues set in step S501 (S509). The process returns to step S502 (NO in S509) to repeat the processes in steps S502 to S508 until the gamut expansion restriction parameters C are calculated for all the hues (YES in S509).

[Conversion Processing]

Figure 6:
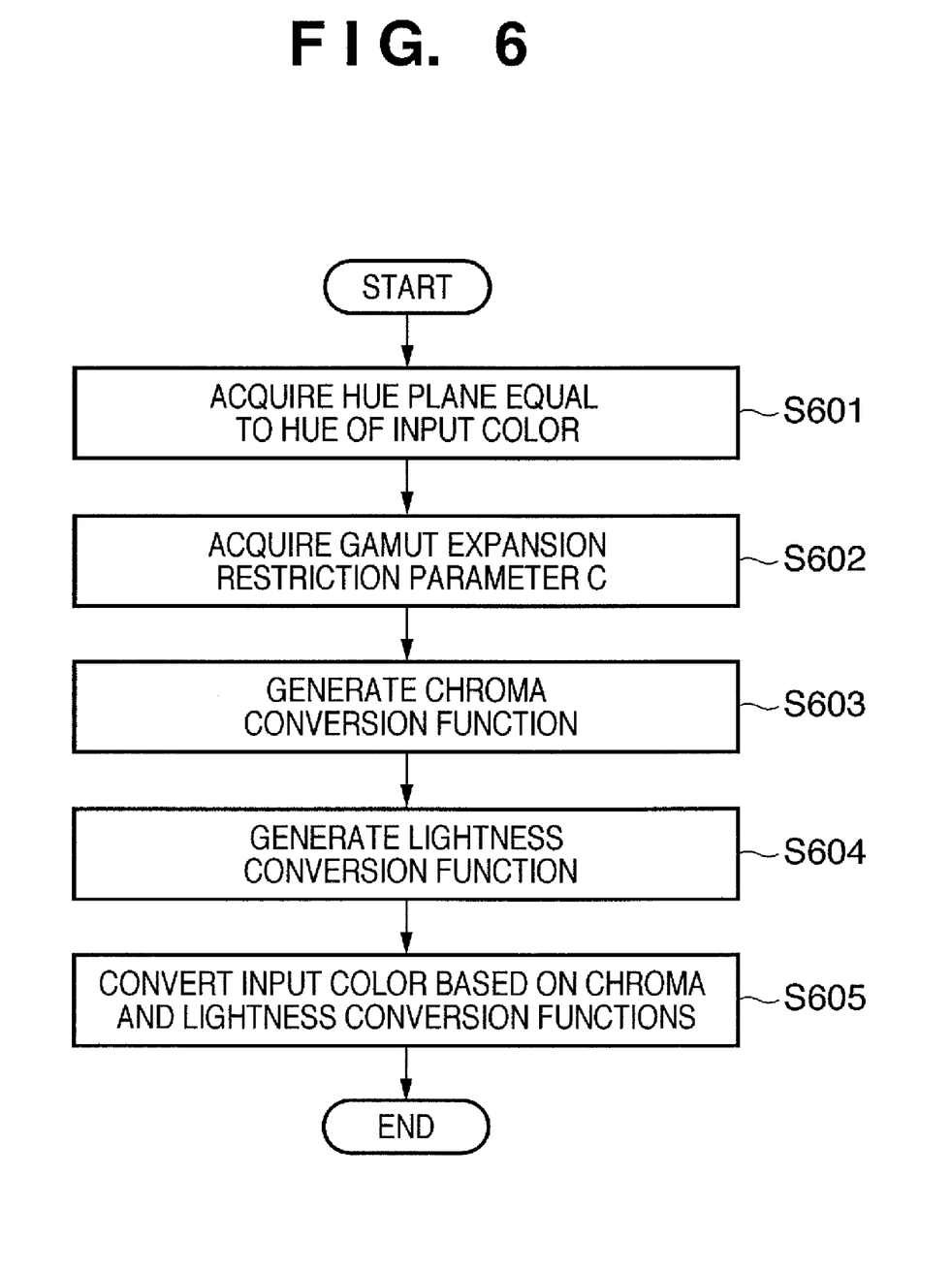
FIG. 6 is a flowchart illustrating conversion processing by the arithmetic unit.

FIG. 6 is a flowchart illustrating conversion processing by the arithmetic unit 101. FIG. 6 shows the processing for one pixel.

The arithmetic unit 101 acquires a hue plane equal to the hue of an input color (pixel) from the input and output gamut boundaries set in step S202 (S601), and acquires the gamut expansion restriction parameter C corresponding to the hue of the input color from the gamut expansion restriction parameters set in step S203 (S602). The arithmetic unit 101 generates a chroma conversion function shown in FIGS. 7A and 7B based on the acquired gamut expansion restriction parameter C (S603).

Figure 7A:
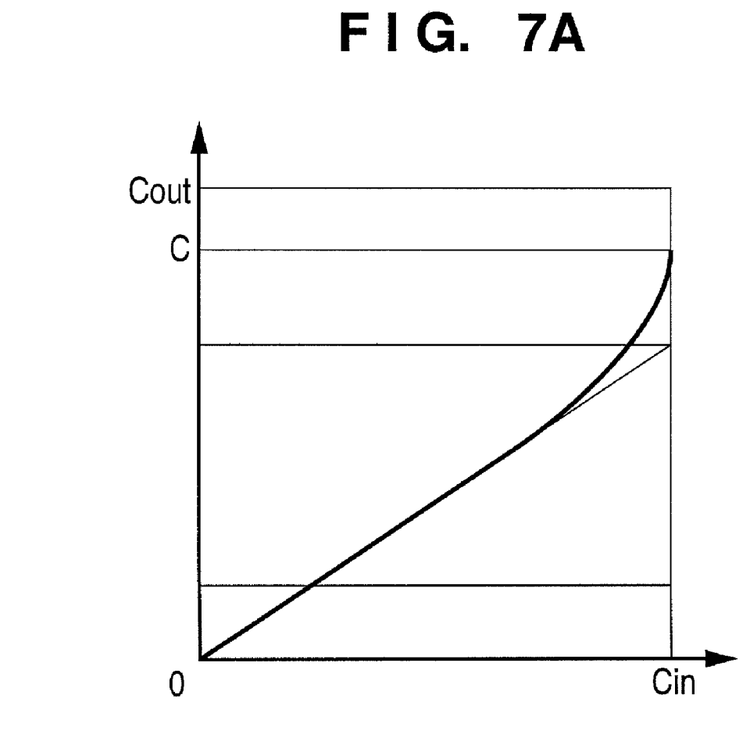
FIGS. 7A and 7B are graphs showing examples of chroma conversion functions.
Figure 7B:
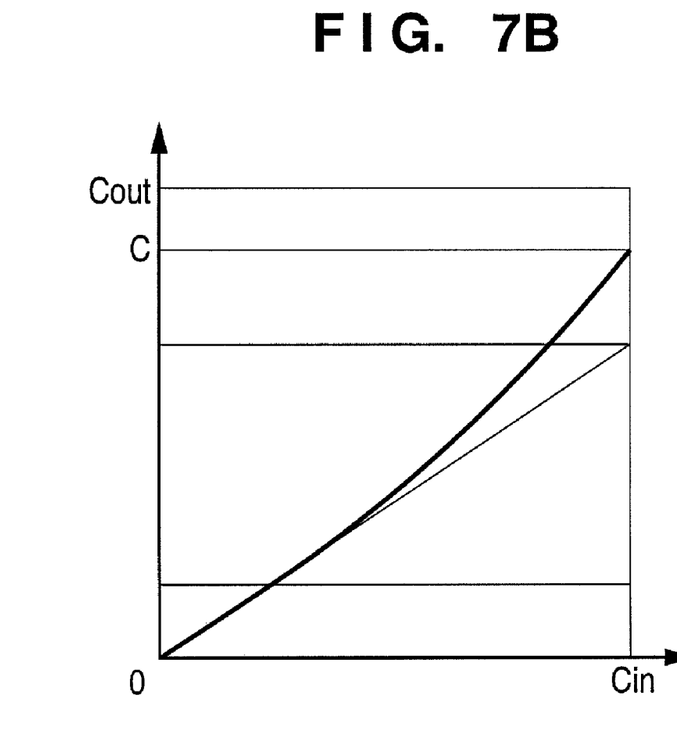

FIGS. 7A and 7B show examples of chroma conversion functions. For example, in order to faithfully reproduce an input chroma, a chroma conversion function which holds a low-chroma range and converts a high-chroma range is generated, as shown in FIG. 7A. On the other hand, when the user wants color reproduction which attaches importance on a tone variation rather than the faithfulness to the input chroma, a chroma conversion function which changes smoothly is generated, as shown in FIG. 7B.

Figure 8A:
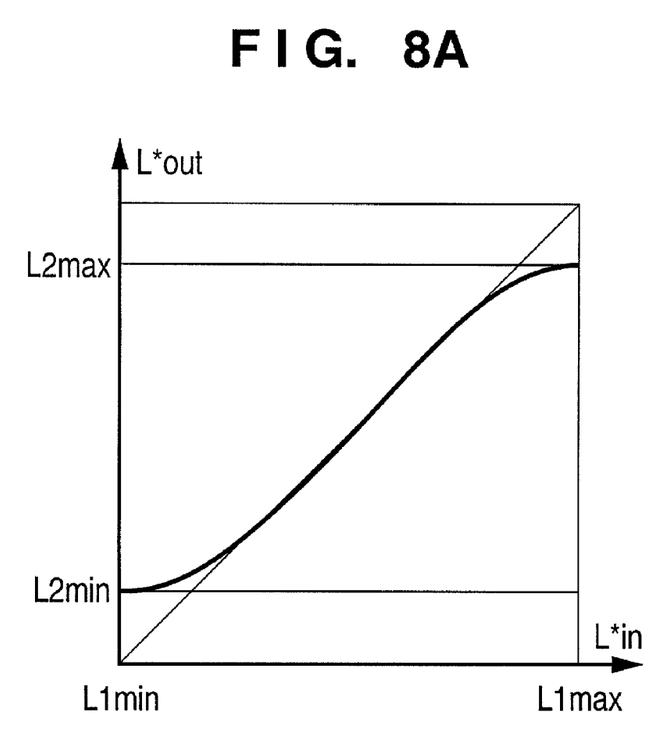
FIGS. 8A and 8B are graphs showing examples of lightness conversion functions.
Figure 8B:
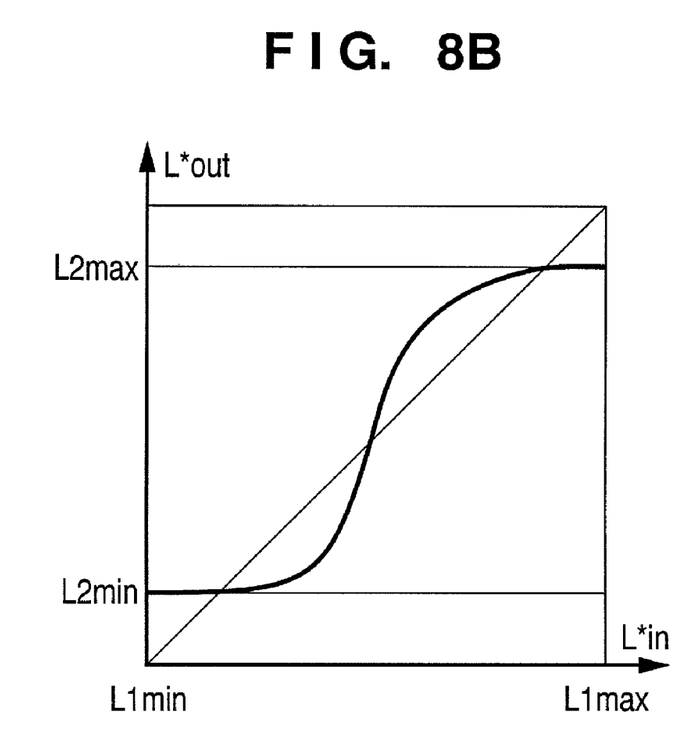

The arithmetic unit 101 acquires input and output lightness ranges based on the input and output gamut boundaries set in step S202, and generates a lightness conversion function shown in FIGS. 8A and 8B (S604). Assume that the lightness range of the input gamut is from a maximum lightness L1max to minimum lightness L1min, and that of the output gamut is from a maximum lightness L2max to minimum lightness L2min.

FIGS. 8A and 8B show examples of lightness conversion functions. For example, in order to faithfully reproduce an input lightness, a lightness conversion function which holds a middle lightness range and compresses high- and low-lightness ranges is generated, as shown in FIG. 8A. On the other hand, when the user wants color reproduction that attaches importance on contrast, a lightness conversion function which has a sharp middle lightness range is generated, as shown in FIG. 8B.

The arithmetic unit 101 converts the input color based on the generated chroma conversion function and lightness conversion function (S605). If the chroma conversion function and lightness conversion function generated for a given hue plane are cached in a memory, they can be used in conversion of an input color of the identical hue plane, and the processes in steps S601 to S604 can be skipped.

As described above, since an increase in chroma of the input color is automatically restricted in accordance with the size and shape of the color gamut, the chroma can be prevented from being excessively increased in the color processing for explaining the color gamut. Since the hue and lightness are correctable, favorable color reproduction can be attained with high precision independently of the sizes and shapes of the input and output gamuts. That is, when the input gamut is restricted, favorable color reproduction effectively using the broad color gamut of the output device can be attained by expanding the color gamut under a given restriction.

A case in which conversion is conducted on an equi-hue plane is described above. Alternatively, in order to use the output gamut more effectively or to reproduce flesh color, sky blue, and the like more favorably, hue conversion may be executed. Upon execution of the hue conversion, the setting of the gamut expansion restriction in step S203 may be made between an input hue and an output hue after the hue conversion, and the hue conversion may be executed prior to application of the chroma conversion function and lightness conversion function in step S605.

The present invention can be applied to a system constituted by a plurality of devices (e.g., host computer, interface, reader, printer) or to an apparatus comprising a single device (e.g., copying machine, facsimile machine).

Further, a storage medium can store program code for performing the above-described processes. A computer system or apparatus (e.g., a personal computer) can read the program code, by a CPU or MPU of the computer system or apparatus, from the storage medium, then execute the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, an OS (operating system) or the like working on the computer can perform a part or entire processes in accordance with designations of the program code.

Furthermore, the program code read from the storage medium can be written in a function expansion card which is inserted into the computer or in a memory provided in a function expansion unit which is connected to the computer, CPU or the like contained in the function expansion card or unit which performs a part or entire process in accordance with designations of the program code.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-100386, filed Mar. 31, 2006, which is hereby incorporated by reference herein in its entirety.

What is claimed is:

1. A method of converting color data in an input gamut into an output gamut larger than the input gamut, the method being performed by a color processing apparatus including an arithmetic unit, the method comprising:

inputting information of the input gamut and the output gamut;

obtaining a plurality of restriction conditions which restrict expansion of a color gamut and respectively correspond to representative hues;

generating, by the arithmetic unit, a first condition of converting chroma of current color data in the input gamut based on the information of the input and output gamuts and a restriction condition corresponding to current hue of the current color data;

generating, by the arithmetic unit, a second condition of converting lightness of the current color data based on the information of the input and output gamuts; and converting, by the arithmetic unit, the current color data into the output gamut using the first and second conditions, wherein maximum chroma in the input gamut of the current hue is converted into restricted chroma corresponding to the restriction condition of the first condition, and the restricted chroma is larger than the maximum chroma in the input gamut and is smaller than maximum chroma in the output gamut of the current hue, wherein maximum lightness in the input gamut of the current hue is converted into maximum lightness in the output gamut of the current hue by the second condition, and wherein the restriction condition corresponding to the current hue is interpolated from the plurality of restriction conditions.

2. The method according to claim 1, wherein the information of each of the input gamut and the output gamut is information indicating a boundary of a color gamut and includes information indicating at least a lightness range of the color gamut and maximum chromas on a plurality of hue planes.

3. The method according to claim 1, wherein in generating the first condition, the restriction condition is automatically determined based on the information of the input and output gamuts and a reproduction target chroma.

4. A color processing apparatus for converting color data in an input gamut into an output gamut larger than the input gamut, the color processing apparatus comprising:

an input section arranged to input information of the input gamut and the output gamut;

an obtaining section arranged to obtain a plurality of restriction conditions which restrict expansion of a color gamut and respectively correspond to representative hues;

a first generator arranged to generate a first condition of converting chroma of current color data in the input gamut based on the information of the input and output gamuts and a restriction condition corresponding to current hue of the current color data;

a second generator arranged to generate a second condition of converting lightness of the current color data based on the information of the input and output gamuts; and a converter arranged to convert the current color data into the output gamut using the first and second conditions, wherein the converter is arranged to convert maximum chroma in the input gamut of the current hue into restricted chroma corresponding to the restriction condition of the first condition, and the restricted chroma is larger than the maximum chroma in the input gamut and is smaller than maximum chroma in the output gamut of the current hue, wherein the converter is arranged to convert maximum lightness in the input gamut of the current hue into maximum lightness in the output gamut of the current hue by the second condition, and wherein the first generator is arranged to interpolate the restriction condition corresponding to the current hue from the plurality of restriction conditions.

5. The color processing apparatus according to claim 4, wherein the information of each of the input gamut and the output gamut is information indicating a boundary of a color gamut and includes information indicating at least a lightness range of the color gamut and maximum chromas on a plurality of hue planes.

6. The color processing apparatus according to claim 4, wherein in generating the first condition, the restriction condition is automatically determined based on the information of the input and output gamuts and a reproduction target chroma.

7. A computer-readable storage medium having stored thereon a method of converting color data in an input gamut into an output gamut larger than the input gamut, the method comprising:

inputting information of the input gamut and the output gamut;

obtaining a plurality of restriction conditions which restrict expansion of a color gamut and respectively correspond to representative hues;

generating a first condition of converting chroma of current color data in the input gamut based on the information of the input and output gamuts and a restriction condition corresponding to current hue of the current color data;

generating a second condition of converting lightness of the current color data based on the information of the input and output gamuts; and converting the current color data into the output gamut using the first and second conditions, wherein maximum chroma in the input gamut of the current hue is converted into restricted chroma corresponding to the restriction condition of the first condition, and the restricted chroma is larger than the maximum chroma in the input gamut and is smaller than maximum chroma in the output gamut of the current hue, wherein maximum lightness in the input gamut of the current hue is converted into maximum lightness in the output gamut of the current hue by the second condition, and wherein the restriction condition corresponding to the current hue is interpolated from the plurality of restriction conditions.

8. The computer-readable storage medium according to claim 7, wherein the information of each of the input gamut and the output gamut is information indicating a boundary of a color gamut and includes information indicating at least a lightness range of the color gamut and maximum chromas on a plurality of hue planes.

9. The computer-readable storage medium according to claim 7, wherein in generating the first condition, the restriction condition is automatically determined based on the information of the input and output gamuts and a reproduction target chroma.

* * * * *